United States Patent
Izumi et al.

(10) Patent No.: US 10,641,340 B2
(45) Date of Patent: May 5, 2020

(54) FITTING STRUCTURE AND STEERING SYSTEM INCLUDING THE SAME

(71) Applicants: JTEKT CORPORATION, Osaka-shi, Osaka (JP); MARUGO RUBBER INDUSTRIES, LTD., Kurashiki-shi, Okayama (JP)

(72) Inventors: Yoshiaki Izumi, Okazaki (JP); Toshiyuki Ohsara, Okazaki (JP); Tsuneharu Takizawa, Kurashiki (JP); Makoto Miyawaki, Kurashiki (JP); Sosuke Imaoka, Kurashiki (JP); Shohei Fujita, Okazaki (JP)

(73) Assignees: JTEKT CORPORATION, Osaka-shi (JP); MARUGO RUBBER INDUSTRIES, LTD., Kurashiki-shi (JP)

( * ) Notice: Subject to any disclaimer, the term of this patent is extended or adjusted under 35 U.S.C. 154(b) by 193 days.

(21) Appl. No.: 15/695,550

(22) Filed: Sep. 5, 2017

(65) Prior Publication Data

US 2018/0073565 A1 Mar. 15, 2018

(30) Foreign Application Priority Data

Sep. 12, 2016 (JP) .................. 2016-177937

(51) Int. Cl.
*B62D 1/20* (2006.01)
*B62D 1/16* (2006.01)
(Continued)

(52) U.S. Cl.
CPC .......... *F16D 1/033* (2013.01); *B60R 13/0846* (2013.01); *B62D 1/16* (2013.01); *B62D 1/20* (2013.01); *B62D 3/02* (2013.01)

(58) Field of Classification Search
CPC ......... B60R 13/02; B60R 13/06; B60R 13/07; B60R 13/0846; B60R 13/0856;
(Continued)

(56) References Cited

U.S. PATENT DOCUMENTS 5,826,918 A * 10/1998 Bowles .................. B60K 15/04
285/24
6,082,333 A 7/2000 Vattelana et al.
(Continued)

FOREIGN PATENT DOCUMENTS

| DE | 9211647 U1 | 1/1993 |
|---|---|---|
| JP | 2006-001504 A | 1/2006 |
| JP | 2013-193592 A | 9/2013 |

OTHER PUBLICATIONS

Feb. 7, 2018 Search Report issued in European Patent Application No. 17190157.2.

*Primary Examiner* — Barry Gooden, Jr.
(74) *Attorney, Agent, or Firm* — Oliff PLC

(57) ABSTRACT

A fitting structure includes an annular seal member; a first fitting member including a first tubular fitting portion having a tubular shape, a first holding portion that contacts the seal member from a first axial end side, and a first restricting portion provided at a position different from a position of the first holding portion; and a second fitting member including a second tubular fitting portion having a tubular shape that is fitted to the first tubular fitting portion from a second axial end side, a second holding portion that contacts the seal member from the second axial end side, and a second restricting portion that contacts the first restricting portion from the second axial end side in a state where the seal member is compressed by a prescribed amount between the first holding portion and the second holding portion.

5 Claims, 3 Drawing Sheets

(51) Int. Cl.
 *B62D 3/02* (2006.01)
 *F16D 1/033* (2006.01)
 *B60R 13/08* (2006.01)

(58) Field of Classification Search
 CPC ............ B60R 13/0861; B60R 13/0892; B60R 2013/0807; B60R 13/08; B62D 1/20; B62D 3/02
 See application file for complete search history.

(56) References Cited

U.S. PATENT DOCUMENTS

| | | | | |
|---|---|---|---|---|
| 7,549,503 | B2 * | 6/2009 | Kanayama | B60R 13/0256 180/443 |
| 8,469,399 | B2 * | 6/2013 | Allen | F16J 15/3224 277/630 |
| 9,200,676 | B2 * | 12/2015 | Yamaguchi | B62D 3/02 |
| 9,216,759 | B2 * | 12/2015 | Kim | F16D 3/84 |
| 9,669,882 | B2 * | 6/2017 | Allen | B62D 25/02 |
| 10,005,484 | B2 * | 6/2018 | Allen | B62D 1/16 |
| 2003/0131443 | A1 * | 7/2003 | Trent | B60R 13/0846 16/2.1 |
| 2013/0057015 | A1 * | 3/2013 | Allen | F16J 15/3224 296/70 |
| 2015/0003901 | A1 | 1/2015 | Yamaguchi | |
| 2015/0130152 | A1 * | 5/2015 | Kim | F16D 3/84 280/93.515 |
| 2016/0031472 | A1 * | 2/2016 | Allen | B62D 1/16 277/300 |

\* cited by examiner

FITTING STRUCTURE AND STEERING SYSTEM INCLUDING THE SAME

INCORPORATION BY REFERENCE

The disclosure of Japanese Patent Application No. 2016-177937 filed on Sep. 12, 2016 including the specification, drawings and abstract is incorporated herein by reference in its entirety.

BACKGROUND

1. Technical Field

The disclosure relates to a fitting structure and a steering system including the same.

2. Description of Related Art

In related art, there is a steering system for a vehicle in which rotational motion due to a steering operation is converted into linear reciprocating motion of a rack shaft via a rack-and-pinion mechanism such that the steering angle of steered wheels is changed. In the steering system, a hole cover is fitted to a tubular portion of a rack housing in which a pinion shaft is accommodated. The steering system is pressed toward the outside of a dash panel of the vehicle via the hole cover in a state where the steering system is fixed to a suspension member of the vehicle. Since the steering system is provided outside a vehicle cabin as described above, rainwater, dust, or the like from a road surface is likely to adhere to the steering system.

Therefore, in a steering system disclosed in, for example, Japanese Unexamined Patent Application Publication No. 2006-1504 (JP 2006-1504 A), a seal member is interposed between a tubular portion of a rack housing and a hole cover such that rainwater or the like is prevented from intruding into the rack housing.

SUMMARY

In a configuration described in JP 2006-1504 A, the seal member is compressed in an axial direction between a flange formed on the tubular portion of the rack housing and an axial end face of the hole cover, and displacement of the rack housing (the tubular portion) in a direction toward an upper side of the vehicle (toward the hole cover) is restricted by the dash panel via the seal member and the hole cover. Therefore, in a case where an external force that lifts the rack housing in a direction toward the upper side of the vehicle acts due to, for example, a road surface reaction force caused by traveling motion of the vehicle, the entire axial load acting between the tubular portion of the rack housing and the hole cover directly acts on the seal member. As a result, the seal member is excessively compressed between the tubular portion and the hole cover, and is likely to be deteriorated.

The disclosure provides a fitting structure that can suppress acceleration of deterioration of a seal member, and a steering system including the same.

A fitting structure according to a first aspect of the disclosure includes a seal member having an annular shape; a first fitting member including a first tubular fitting portion having a tubular shape, a first holding portion that contacts the seal member from a first axial end side, and a first restricting portion that is provided at a position different from a position of the first holding portion; and a second fitting member including a second tubular fitting portion having a tubular shape that is fitted to the first tubular fitting portion from a second axial end side, a second holding portion that contacts the seal member from the second axial end side, and a second restricting portion that contacts the first restricting portion from the second axial end side in a state where the seal member is compressed by a prescribed amount between the first holding portion and the second holding portion.

In this configuration, for example, in a case where an external force in a direction toward the second fitting member acts on the first fitting member, the first restricting portion and the second restricting portion contact each other and an axial load based on the external force is supported between the first and second restricting portions. Since the axial load is thus received by the first restricting portion and the second restricting portion contacting each other, the seal member is prevented from being compressed by an amount more than the prescribed amount, and thus it is possible to suppress acceleration of deterioration of the seal member that is caused by excessive compression.

In the fitting structure according to the aspect, the first restricting portion may be provided to be closer to the second axial end side than the first holding portion of the first fitting member is, and the second restricting portion may be provided to be closer to the second axial end side than the second holding portion of the second fitting member is.

In this configuration, the second restricting portion is provided to be more distant from an opening of the second fitting member on the first axial end side than the second holding portion is. Accordingly, the axial load is supported by a portion of the second fitting member, the portion being distant from the opening on the first axial end side. Therefore, as compared to a case where the axial load is received by a portion of the second fitting member, the portion being in the vicinity of the opening on the first axial end side, the second fitting member is less likely to be deformed, and thus, it is possible to reduce an influence on the second holding portion when the axial load is received. As a result, it is possible to appropriately suppress excessive compression of the seal member.

In the fitting structure according to the aspect, the second fitting member may include an arm portion that extends toward the first axial end side and a claw portion that radially extends from a distal end of the arm portion; and the first fitting member may include an engagement portion that is engageable with the claw portion.

In this configuration, the claw portion engages with the engagement portion such that the second fitting member is restricted from moving toward the second axial end side and being separated from the first fitting member. Therefore, it is possible to restrain the second fitting member from falling off when transportation or the like is performed in a state where the second fitting member is fitted to the first fitting member, for example.

In the fitting structure according to the aspect, the second tubular fitting portion may be loosely fitted to the first tubular fitting portion such that the second fitting member is fitted to the first fitting member; and an axial length of a fitting area between the first tubular fitting portion and the second tubular fitting portion may be set such that compression of the seal member is maintained between the first holding portion and the second holding portion even in a state where the second tubular fitting portion is most inclined with respect to the first tubular fitting portion.

In this configuration, since the second tubular fitting portion is loosely fitted to the first tubular fitting portion, it is possible to reduce stress acting on the first and second fitting members in a fitting state where the second fitting member is fitted to the first fitting member, as compared to a case where the second tubular fitting portion is press-fitted to the first tubular fitting portion. Thus, it is possible to suppress acceleration of deterioration of the first and second fitting members in a case where the first and second fitting members are disposed in a severe environment such as a high-temperature environment. In the case where the second tubular fitting portion is loosely fitted to the first tubular fitting portion, there is a possibility that the second fitting member may be inclined with respect to the first fitting member. In this regard, in this configuration, the axial length of the fitting area between the first tubular fitting portion and the second tubular fitting portion is set such that compression of the seal member is maintained even in a state where the second tubular fitting portion is most inclined with respect to the first tubular fitting portion. Therefore, even in a case where the second fitting member is loosely fitted to the first fitting member, it is possible to secure a sealing property.

A steering system according to a second aspect of the disclosure includes the fitting structure according to the above-described first aspect of the disclosure. In the steering system, the first fitting member may be a housing that accommodates a pinion shaft included in a rack-and-pinion mechanism such that a portion of the pinion shaft protrudes from the housing, and the second fitting member may be a hole cover that covers the pinion shaft at a position between the housing and a dash panel of a vehicle.

In this configuration, the seal member is restricted from being excessively compressed in a case where a great external force acts on the rack housing due to a road surface reaction force or the like, for example. Therefore, it is possible to suppress acceleration of deterioration of the seal member.

According to the above-described aspects of the disclosure, it is possible to suppress acceleration of deterioration of the seal member.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
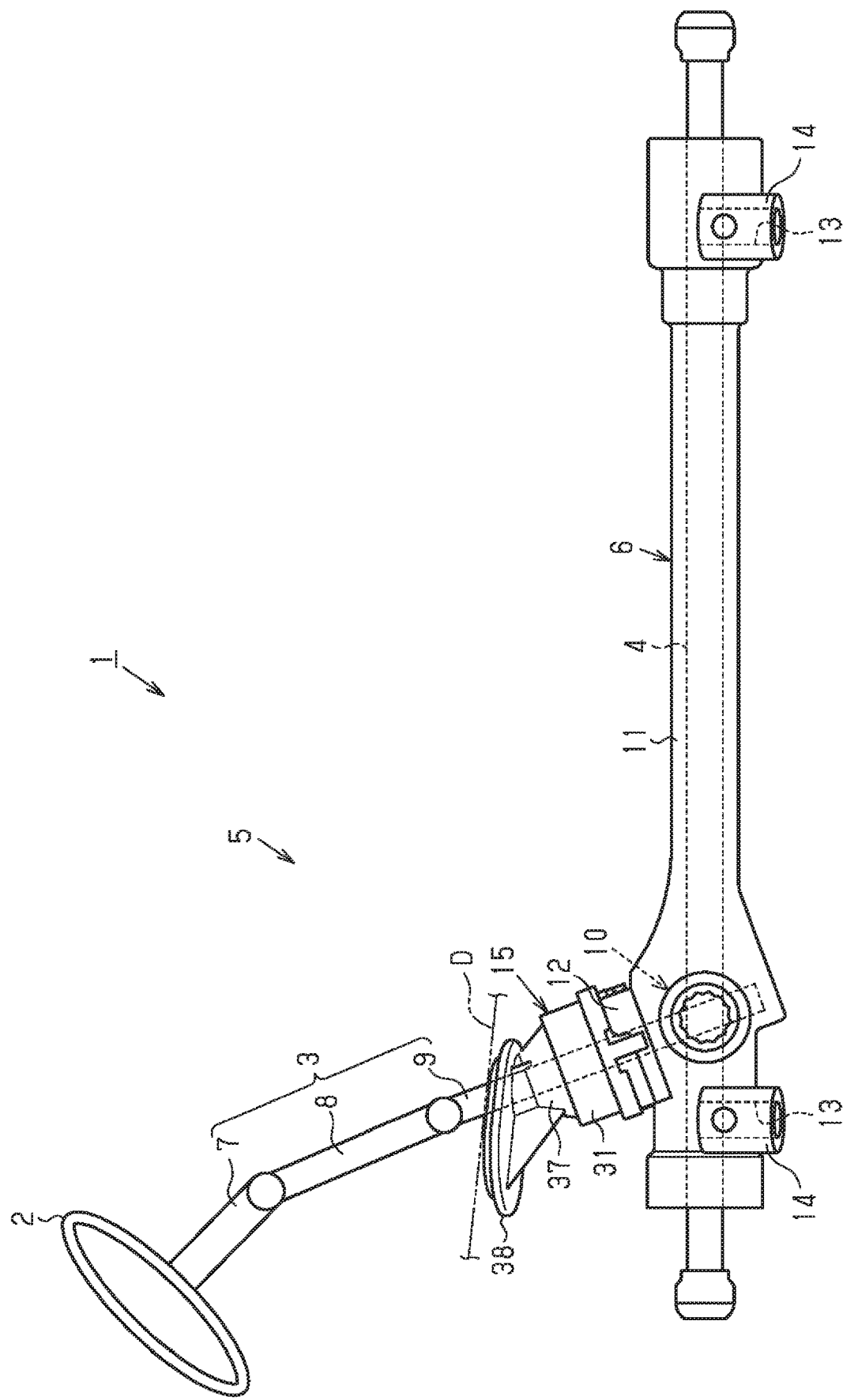
FIG. 1 is a schematic configuration view of a steering system.

Hereinafter, a fitting structure and a steering system according to an embodiment will be described with reference to drawings. As illustrated in FIG. 1, a steering system 1 includes a steering mechanism 5 which includes a steering shaft 3 to which a steering wheel 2 is fixed, and a rack shaft 4 which reciprocates in an axial direction thereof in accordance with rotation of the steering shaft 3. In addition, the steering system 1 includes a rack housing 6 which is a housing in which the rack shaft 4 is inserted such that the rack shaft 4 can reciprocate. Note that, the steering shaft 3 is formed by connecting a column shaft 7, an intermediate shaft 8, and a pinion shaft 9 in the stated order from the steering wheel 2-side.

The rack shaft 4 and the pinion shaft 9 are disposed at a prescribed crossing angle in the rack housing 6. A rack-and-pinion mechanism 10 is formed by engaging rack teeth with pinion teeth. The rack teeth are formed on the rack shaft 4 and the pinion teeth are formed on the pinion shaft 9. In addition, each of opposite ends of the rack shaft 4 is connected to a knuckle to which a steered wheel is attached via a tie rod (not shown). Therefore, in the steering system 1, rotation of the steering shaft 3 due to a steering operation is converted to axial movement of the rack shaft 4 via the rack-and-pinion mechanism 10 and the axial movement is transmitted to the knuckles via the tie rods such that the turning angle of the steered wheels, that is, an advancing direction of a vehicle is changed.

The rack housing 6 includes a cylindrical housing main body 11 that extends in the axial direction of the rack shaft 4, and a cylindrical tubular portion 12 that is integrally formed with the housing main body 11, and extends in an axial direction of the pinion shaft 9. Note that, the rack housing 6 is formed of metal material such as aluminum. An attachment portion 14, which includes a through-hole 13 extending in a vehicle up-and-down direction, is formed at each of the opposite end portions of the housing main body 11. The pinion shaft 9 protrudes from the tubular portion 12. The pinion shaft 9 extends up to a position inside a dash panel D (in a vehicle cabin) and is connected to the intermediate shaft 8. The dash panel D separates an engine compartment and the vehicle cabin.

A hole cover 15 as a second fitting member, which covers the pinion shaft 9 at a position between the tubular portion 12 and the dash panel D, is fitted to the tubular portion 12 of the rack housing 6 as a first fitting member. Note that, a seal member (not shown) is interposed between the hole cover 15 and the dash panel D. The steering system 1 is attached to a main body of the vehicle by connecting the rack housing 6 to a suspension member (not shown) of the vehicle via a bolt (not shown) inserted into each through-hole 13 in a state where the steering system 1 is pressed against the dash panel D of the vehicle via the hole cover 15.

Figure 2:
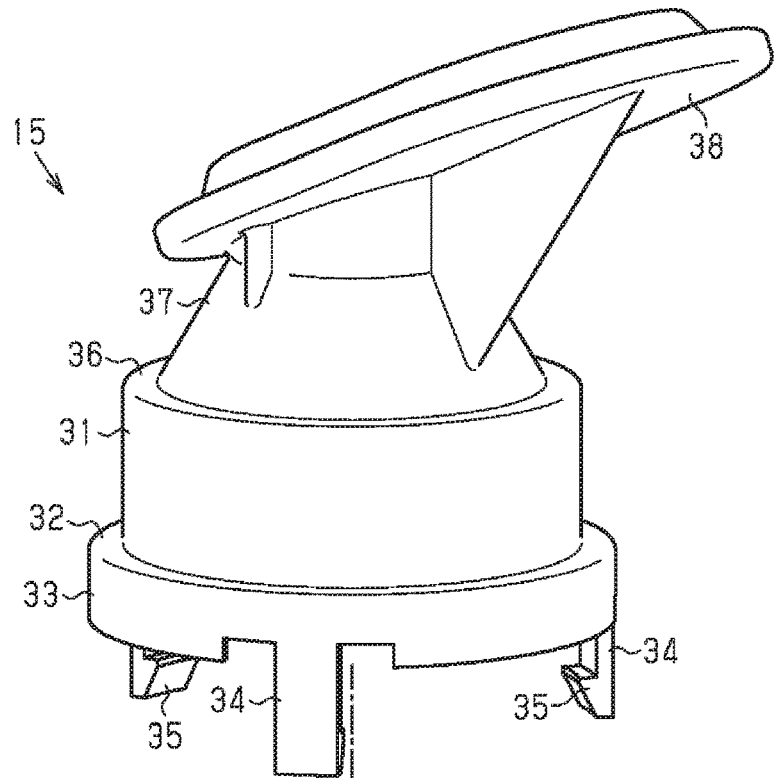
FIG. 2 is an exploded perspective view illustrating a fitting structure including a tubular portion of a rack housing and a hole cover.
Figure 2:
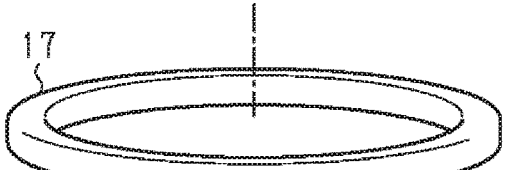
Figure 2:
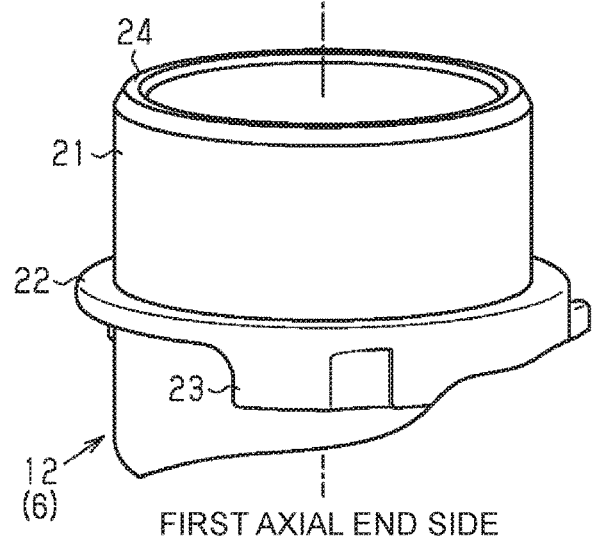
Figure 3:
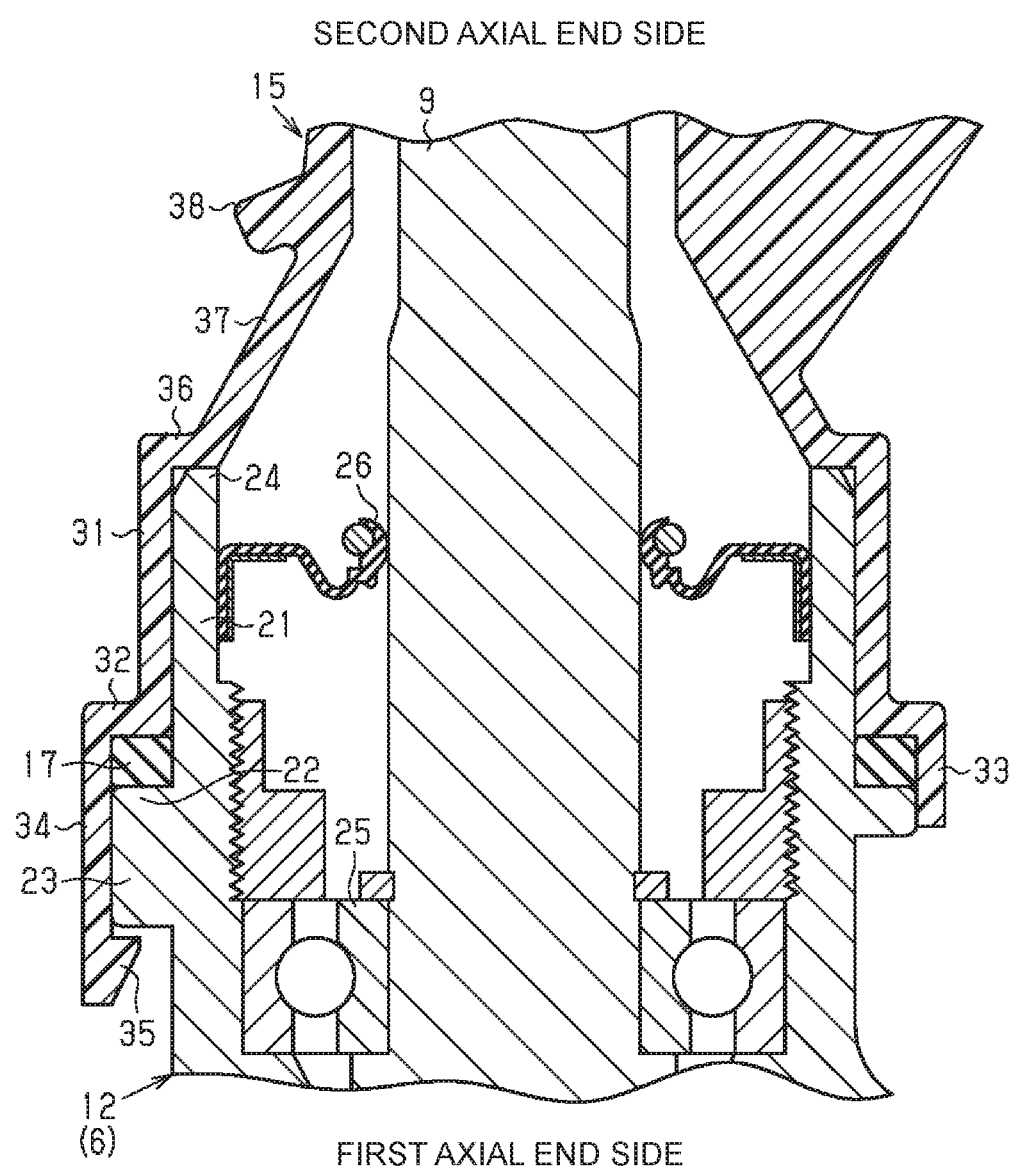
FIG. 3 is a sectional view illustrating the fitting structure including the tubular portion of the rack housing and the hole cover.

Next, a fitting structure of the tubular portion 12 and the hole cover 15 will be described. As illustrated in FIGS. 2 and 3, the hole cover 15 is fitted to the tubular portion 12 with a seal member 17 having an annular shape such as packing being interposed in an axial direction between the hole cover 15 and the tubular portion 12, so that rainwater, dust, or the like from a road surface is prevented from intruding into a space between the tubular portion 12 and the hole cover 15. Note that, hereinafter, the lower side of the vehicle will be referred to as a first axial end side and the upper side of the vehicle will be referred to as a second axial end side for convenience of description.

The tubular portion 12 includes a first tubular fitting portion 21 having a cylindrical shape which opens toward the second axial end side, a first holding portion 22 having an annular shape which extends radially outward from a first axial end portion of the first tubular fitting portion 21, and a plurality of engagement portions 23 each of which extends from a first axial end face of the first holding portion 22 to the first axial end side over a prescribed range in a circumferential direction. An end portion of the opening of the first tubular fitting portion 21 functions as a first restricting portion 24 which includes a flat end face extending over the entire circumferential portion thereof. That is, the first restricting portion 24 is provided to be closer to the second axial end side than the first holding portion 22 of the tubular portion 12 is. The outside diameter of the first tubular fitting portion 21 is set to be substantially equal to the inside diameter of the seal member 17 and the outside diameter of the first holding portion 22 is set to be substantially equal to the outside diameter of the seal member 17. The first holding portion 22 contacts the seal member 17 from the first axial end side and an end face of the first holding portion 22 on the second axial end side contacts the seal member 17. The outer peripheral face of the first holding portion 22 is formed to be flush with the outer peripheral face of each engagement portion 23. A bearing 25 is fixed to the inner peripheral portion of the tubular portion 12. A seal member 26 such as a lip seal is fixed on the second axial end side (a side close to the end portion of the opening of the tubular portion 12) with respect to the bearing 25. That is, the seal member 26 is fixed at a position closer to the second axial end side (i.e., closer to the end portion of the opening of the tubular portion 12) than the bearing 25 is. The bearing 25 supports the pinion shaft 9 such that the pinion shaft 9 is rotatable.

The hole cover 15 is formed of resin material and is formed to have a tubular shape as a whole. The hole cover 15 includes a second tubular fitting portion 31 having a cylindrical shape, a second holding portion 32 having an annular shape which extends radially outward from a first axial end portion of the second tubular fitting portion 31, and a cylindrical skirt portion 33 which extends from a radial outer end portion of the second holding portion 32 toward the first axial end side. The inside diameter of the second tubular fitting portion 31 is set to be slightly larger than the outside diameter of the first tubular fitting portion 21, and the second tubular fitting portion 31 is loosely fitted to the outer peripheral portion of the first tubular fitting portion 21 such that a gap is provided between the second tubular fitting portion 31 and the outer peripheral portion of the first tubular fitting portion 21. In addition, the axial length of a fitting area between the second tubular fitting portion 31 and the first tubular fitting portion 21 is set to be equal to or longer than a prescribed length such that compression of the seal member 17 is maintained between the first holding portion 22 and the second holding portion 32 even in a state where the second tubular fitting portion 31 is most inclined with respect to the first tubular fitting portion 21. The second holding portion 32 contacts the seal member 17 from the second axial end side and an inner end face of the second holding portion 32 on the first axial end side contacts the seal member 17. The inside diameter of the skirt portion 33 is formed to be slightly larger than the outside diameter of the first holding portion 22 and the skirt portion 33 is loosely fitted to the outer peripheral portion of the first holding portion 22. A rectangular plate-shaped arm portion 34 which extends toward the first axial end side is formed at each of a plurality of (in this embodiment, three) positions on the skirt portion 33, the positions corresponding to the engagement portions 23. A claw portion 35 which protrudes radially inward is formed on a first axial end portion of each arm portion 34. Each claw portion 35 is formed to have a triangular section in which the protrusion amount gradually increases from the first axial end side toward the second axial end side.

In addition, the hole cover 15 includes a second restricting portion 36 having an annular shape which extends radially inward from a second axial end portion of the second tubular fitting portion 31, a tapered tube portion 37 which is tapered toward the second axial end side from an inner peripheral edge of the second restricting portion 36, and a flange portion 38 which extends radially outward from a second axial end portion of the tapered tube portion 37. That is, the second restricting portion 36 is provided to be closer to the second axial end side than the second holding portion 32 of the hole cover 15 is. The inside diameter of the second restricting portion 36 is set to be substantially equal to the inside diameter of the first tubular fitting portion 21. The flange portion 38 is formed to have an oval shape extending from the second axial end portion of the tapered tube portion 37, and the flange portion 38 is provided to be inclined in a direction crossing the axial direction in accordance with a crossing angle between the rack shaft 4 and the pinion shaft 9.

The hole cover 15 is attached to the tubular portion 12 when the second tubular fitting portion 31 is loosely fitted to the outer peripheral portion of the first tubular fitting portion 21, the skirt portion 33 is loosely fitted to the outer peripheral portion of the second holding portion 32, and the claw portions 35 engage with the engagement portions 23. In this state, the end face of the first restricting portion 24 contacts an inner end face of the second restricting portion 36 on the first axial end side, and the seal member 17 seals a gap between the tubular portion 12 and the hole cover 15 while being compressed by a prescribed amount between the first holding portion 22 and the second holding portion 32. The hole cover 15 is restricted from moving in a radial direction with the second tubular fitting portion 31 fitted to the first tubular fitting portion 21. The hole cover 15 is restricted from moving toward the first axial end side (i.e., in a pressing direction) with the second restricting portion 36 contacting the first restricting portion 24, and is restricted from moving toward the second axial end side (i.e., in a pulling-out direction) with the claw portions 35 engaging with the engagement portions 23. Each claw portion 35 does not always engage with a first axial end face of the corresponding engagement portion 23 and each claw portion 35 faces the first axial end face of the corresponding engagement portion 23 with a slight axial gap provided therebetween. In addition, the prescribed amount by which the seal member 17 is compressed is an amount set such that a sufficient sealing property between the tubular portion 12 and the hole cover 15 is secured and the seal member 17 is not compressed so excessively as to accelerate the deterioration of the seal member 17. The prescribed amount is determined through an experiment or the like in advance.

As described above, according to this embodiment, the following effects can be achieved. (1) The hole cover 15 includes the second restricting portion 36 which contacts the first restricting portion 24 of the tubular portion 12 from the second axial end side in a state where the seal member 17 is compressed by a prescribed amount between the first holding portion 22 of the tubular portion 12 of the rack housing 6 and the second holding portion 32 of the hole cover 15. Therefore, in a case where an external force in a direction toward the hole cover 15 acts on the rack housing 6, the first restricting portion 24 and the second restricting portion 36 contact each other and an axial load based on the external force is supported between the first and second restricting portions 24 and 36. That is, displacement of the rack housing 6 (the tubular portion 12) in a direction toward the upper side of the vehicle (i.e., toward the hole cover 15) is restricted by the dash panel D via the hole cover 15. Therefore, the seal member 17 is prevented from being compressed by an amount more than the prescribed amount, and thus it is possible to suppress acceleration of deterioration of the seal member 17 due to excessive compression of the seal member 17, and to maintain a sealing property for a long period of time.

(2) The first restricting portion 24 is provided to be closer to the second axial end side than the first holding portion 22 is, and the second restricting portion 36 is provided to be closer to the second axial end side than the second holding portion 32 is. That is, the second restricting portion 36 is provided to be more distant from an opening of the hole cover 15 on the first axial end side than the second holding portion 32 is. Accordingly, the axial load is supported by a portion of the hole cover 15, the portion being distant from the opening on the first axial end side. Therefore, as compared to a case where the axial load is received by a portion of the hole cover 15, the portion being in the vicinity of the opening on the first axial end side, the hole cover 15 is less likely to be deformed, and it is possible to reduce an influence on the second holding portion 32 when the axial load is received. As a result, it is possible to appropriately suppress excessive compression of the seal member 17. Particularly, in this embodiment, the tubular portion 12 (the rack housing 6) is a metal member formed of metal material and the hole cover 15 is a resin member formed of resin material. Therefore, the strength of the hole cover 15 is lower than that of the tubular portion 12 and is likely to be deformed, and thus a large effect can be obtained by employing the above-described configuration.

(3) Since the hole cover 15 includes the claw portions 35 which can engage with the engagement portions 23 of the tubular portion 12, the hole cover 15 is restricted from moving toward the second axial end side and being separated from the tubular portion 12. As a result, it is possible to restrain the hole cover 15 from falling off when transportation or the like is performed in a state where the hole cover 15 is fitted to the rack housing 6.

(4) Since the second tubular fitting portion 31 is loosely fitted to the first tubular fitting portion 21, it is possible to reduce stress acting on the hole cover 15 in a fitting state where the hole cover 15 is fitted to the tubular portion 12, as compared to a case where the second tubular fitting portion 31 is press-fitted to the first tubular fitting portion 21. Thus, it is possible to suppress acceleration of deterioration of the hole cover 15 in a case where the hole cover 15 is disposed in a severe environment such as a high-temperature environment. Particularly, in this embodiment, the hole cover 15 is formed of resin material, and thus a large effect can be obtained by employing the above-described configuration. In a case where the second tubular fitting portion 31 is loosely fitted to the first tubular fitting portion 21, there is a possibility that the hole cover 15 may be inclined with respect to the tubular portion 12. In this regard, in this embodiment, the gap between the first tubular fitting portion 21 and the second tubular fitting portion 31 and the axial length of the fitting area between the first tubular fitting portion 21 and the second tubular fitting portion 31 are set such that compression of the seal member 17 is maintained between the first holding portion 22 and the second holding portion 32 even in a state where the second tubular fitting portion 31 is most inclined with respect to the first tubular fitting portion 21. Therefore, even in a case where the hole cover 15 is loosely fitted to the tubular portion 12, it is possible to secure a sealing property.

Note that, the above-described embodiment can be appropriately modified as follows. In the above-described embodiment, the axial length of the fitting area between the first tubular fitting portion 21 and the second tubular fitting portion 31 may be set to be smaller than the prescribed length. In addition, the second tubular fitting portion 31 may be press-fitted to the first tubular fitting portion 21.

In the above-described embodiment, the first restricting portion 24 is provided to be closer to the second axial end side than the first holding portion 22 is, and the second restricting portion 36 is provided to be closer to the second axial end side than the second holding portion 32 is. However, the disclosure is not limited to this configuration. The first and second restricting portions 24 and 36 may be provided at the same positions as the positions of the first and second holding portions 22 and 32 in the axial direction. Alternatively, the first restricting portion 24 may be provided to be closer to the first axial end side than the first holding portion 22 is, and the second restricting portion 36 may be provided to be closer to the first axial end side than the second holding portion 32 is.

In the above-described embodiment, the hole cover 15 may not be provided with the arm portions 34 and the claw portions 35, and the tubular portion 12 may not be provided with the engagement portions 23, and thus, the hole cover 15 may not be restricted from moving toward the second axial end side. In this case, for example, the skirt portion 33 may be lightly press-fitted to the outer peripheral portion of the first holding portion 22.

In the above-described embodiment, the seal member 17 is compressed by the prescribed amount between the first holding portion 22 and the second holding portion 32, and the first restricting portion 24 contacts the second restricting portion 36 in a state where the tubular portion 12 is attached to the hole cover 15 and the steering system 1 is attached to the vehicle. However, the disclosure is not limited to this configuration. The first restricting portion 24 may not always contact the second restricting portion 36, and the first restricting portion 24 may contact the second restricting portion 36 only before the seal member 17 is excessively compressed such that the compression amount of the seal member 17 is excessive (the compression amount is larger than the prescribed amount), for example, in a case where an external force is applied, as long as it is possible to secure a sealing property of the seal member 17 in a state where the steering system 1 is attached to the vehicle.

In the above-described embodiment, a fitting structure in which the rack housing 6 (the tubular portion 12) is the first fitting member and the hole cover 15 is the second fitting member is applied to the steering system 1. However, the disclosure is not limited to this configuration, and the fitting structure in this embodiment may be applied to another device.

What is claimed is:

1. A fitting structure comprising:
   a seal member having an annular shape;
   a first fitting member including a first tubular fitting portion having a tubular shape, a first holding portion in contact with the seal member from a first axial end side, and a first restricting portion disposed at a position different from a position of the first holding portion; and
   a second fitting member including a second tubular fitting portion having a tubular shape fitted to a radially-outer periphery of the first tubular fitting portion from a second axial end side, a second holding portion in contact with the seal member from the second axial end side, and a second restricting portion in contact with the first restricting portion from the second axial end side in a state where the seal member is compressed by a prescribed amount between the first holding portion and the second holding portion, wherein the first restricting portion is disposed closer to the second axial end side than the first holding portion of the first fitting member, and the second restricting portion is disposed closer to the second axial end side than the second holding portion of the second fitting member.

2. The fitting structure according to claim 1, wherein:
the second fitting member includes:
   an arm portion extending toward the first axial end side, and
   a claw portion radially extending from a distal end of the arm portion; and
the first fitting member includes an engagement portion configured to engage the claw portion.

3. The fitting structure according to claim 1, wherein:
the second tubular fitting portion is loosely fitted to the first tubular fitting portion such that the second fitting member is fitted to the first fitting member; and
an axial length of a fitting area between the first tubular fitting portion and the second tubular fitting portion is such that compression of the seal member is maintained between the first holding portion and the second holding portion while the second tubular fitting portion is at a maximum angle with respect to the first tubular fitting portion.

4. The fitting structure according to claim 1, wherein:
the first fitting member is formed of a metal material; and
the second fitting member is formed of a resin material.

5. A steering system comprising:
the fitting structure according to claim 1, wherein
the first fitting member is a housing accommodating a pinion shaft of a rack-and-pinion mechanism such that a portion of the pinion shaft protrudes from the housing, and
the second fitting member is a hole cover covering the pinion shaft at a position between the housing and a dash panel of a vehicle.

* * * * *